United States Patent
Meyer Timmerman Thijssen

(10) Patent No.: US 12,117,629 B2
(45) Date of Patent: Oct. 15, 2024

(54) FABRICATION OF OPTICAL DEVICES UTILIZING DICING TO MAXIMIZE CHAMBER SPACE

(71) Applicant: Applied Materials, Inc., Santa Clara, CA (US)

(72) Inventor: Rutger Meyer Timmerman Thijssen, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 181 days.

(21) Appl. No.: 17/701,377

(22) Filed: Mar. 22, 2022

(65) Prior Publication Data

US 2022/0308273 A1    Sep. 29, 2022

Related U.S. Application Data

(60) Provisional application No. 63/165,961, filed on Mar. 25, 2021.

(51) Int. Cl.
*G02B 5/18* (2006.01)
*G02B 3/00* (2006.01)

(52) U.S. Cl.
CPC ......... *G02B 5/1847* (2013.01); *G02B 3/0012* (2013.01)

(58) Field of Classification Search
None
See application file for complete search history.

(56) References Cited

U.S. PATENT DOCUMENTS

| | | |
|---|---|---|
| 6,411,377 B1 * | 6/2002 | Noguchi ................. H01J 37/00 356/237.4 |
| 9,209,591 B2 | 12/2015 | Takeda et al. |
| 9,537,046 B2 | 1/2017 | Takeda et al. |
| 10,823,888 B1 * | 11/2020 | Evans ................. G02B 5/1828 |
| 2004/0173862 A1 * | 9/2004 | Oohara ................ G02B 6/4249 257/432 |
| 2008/0149590 A1 | 6/2008 | Maeda et al. |
| 2014/0111875 A1 | 4/2014 | Herard |
| 2020/0386911 A1 * | 12/2020 | Doshay ................. G02B 1/002 |

FOREIGN PATENT DOCUMENTS

| | | |
|---|---|---|
| JP | 2009178780 A | 8/2009 |
| KR | 20070017129 A | 2/2007 |
| WO | 2010049887 A1 | 5/2010 |

OTHER PUBLICATIONS

PCT/US2022/021262, International Search Report and Written Opinion dated Jun. 28, 2022, 10 pages.

* cited by examiner

*Primary Examiner* — Shamim Ahmed

(57) ABSTRACT

Embodiments of the present disclosure generally relate to optical device fabrication. In particular, embodiments described herein relate to a method of forming a plurality of optical devices. In one embodiment, a method includes dicing a plurality of optical device lenses from a substrate, disposing the plurality of optical device lenses on a carrier, and performing at least one process on the plurality of optical device lenses to form a plurality of optical devices, each optical device having a plurality of optical device structures.

20 Claims, 7 Drawing Sheets

FABRICATION OF OPTICAL DEVICES UTILIZING DICING TO MAXIMIZE CHAMBER SPACE

CROSS-REFERENCE TO RELATED APPLICATIONS

This application claims benefit of U.S. Provisional Patent Application No. 63/165,961, filed Mar. 25, 2021, which is herein incorporated by reference in its entirety.

BACKGROUND

Field

Embodiments of the present disclosure generally relate to optical device fabrication. In particular, embodiments described herein relate to a method of forming a plurality of optical devices.

Description of the Related Art

Optical devices may be used to manipulate the propagation of light using structures of the optical device formed on an optical device substrate. These structures alter light propagation by inducing localized phase discontinuities (i.e., abrupt changes of phase over a distance smaller than the wavelength of light). These structures may be composed of different types of materials, shapes, or configurations on the optical device substrate and may operate based upon different physical principles.

Fabricating optical devices includes depositing and patterning device material disposed on one or more substrates. Multiple optical devices may be manufactured on a single substrate, and the optical devices are typically diced from the substrate at the end of the process flow. However, after dicing, sub-optimal optical devices may be discarded due to patterning errors, edge discontinuities, or other errors. Thus, overall throughput of the optical device fabrication process is reduced.

Accordingly, what is needed in the art is an improved method of forming a plurality of optical devices.

SUMMARY

In one embodiment, a method is provided. The method includes dicing a plurality of optical device lenses from a substrate, disposing the plurality of optical device lenses on a carrier, and performing at least one process on the plurality of optical device lenses to form a plurality of optical devices, each optical device having a plurality of optical device structures.

In another embodiment, a method is provided. The method includes dicing a plurality of optical device lenses from a substrate after performing one or more patterning processes, disposing the plurality of optical device lenses on a carrier, and performing at least one process on the plurality of optical device lenses to form a plurality of optical devices, each optical device having a plurality of optical device structures.

In yet another embodiment, a method is provided. The method includes dicing a plurality of optical device lenses from a substrate, disposing the plurality of optical device lenses on a carrier, wherein the carrier is able to retain 10 or more optical device lenses, and performing at least one process on the plurality of optical device lenses to form a plurality of optical devices, each optical device having a plurality of optical device structures.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of scope, as the disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present subject matter generally relate to optical device fabrication. In particular, embodiments described herein relate to a method of forming a plurality of optical devices.

Figure 1:
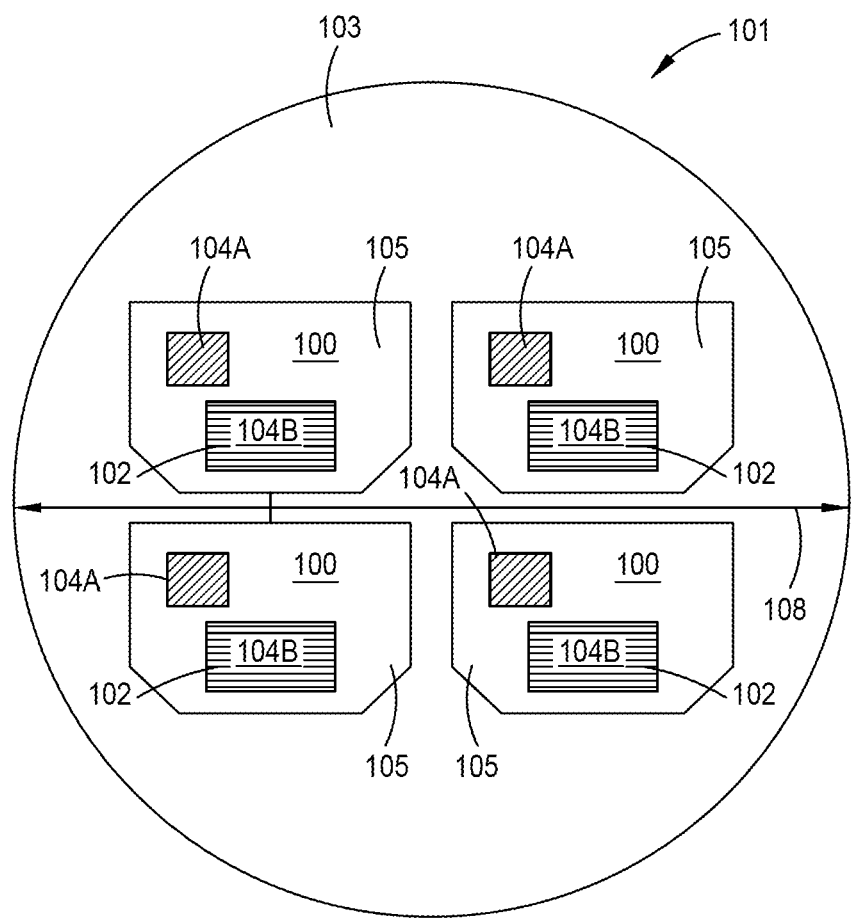
FIG. 1 is a schematic, plan view of a substrate according to one or more embodiments.

FIG. 1 is a schematic, plan view of a substrate 101 having a diameter 108. The substrate 101 includes a plurality of optical devices 100. Each optical device 100 includes an optical device lens 105 corresponding to a portion of a top surface 103 of the substrate 101. Each optical device 100 includes a plurality of optical device structures 102. The optical device structures 102 may be nanostructures having sub-micron dimensions, e.g., nano-sized dimensions.

In one embodiment, which can be combined with other embodiments described herein, regions of the optical device structures 102 correspond to one or more gratings, such as a first grating 104A and a second grating 104B. In one embodiment, which can be combined with other embodiments described herein, one or more of the optical devices 100 is a waveguide combiner, such as an augmented reality waveguide combiner, that includes at least the first grating 104A corresponding to an input coupling grating and the second grating 104B corresponding to an output coupling grating. In another embodiment, which can be combined with other embodiments described herein, one or more of the optical devices 100 is a flat optical device, such as a metasurface.

The substrate 101 may be formed from any suitable material, provided that the material functions as an optical device lens 105 to adequately transmit light in a desired wavelength or wavelength range and can serve as an adequate support for the optical device structures 102. In some embodiments, which can be combined with other embodiments described herein, the material of the substrate 101 has a refractive index that is relatively low compared to the refractive index of the plurality of optical device structures 102. Substrate selection may include substrates of any suitable material, including, but not limited to, amorphous dielectrics, non-amorphous dielectrics, crystalline dielectrics, silicon oxide, polymers, and combinations thereof. In some embodiments, which may be combined with other embodiments described herein, the substrate 101 includes a transparent material. In one example, the substrate 101 includes silicon (Si), silicon dioxide ($SiO_2$), silicon carbide (SiC), germanium (Ge), silicon germanium (SiGe), indium phosphide (InP), gallium arsenide (GaAs), gallium nitride (GaN), fused silica, or sapphire. In another example, the substrate 101 includes high-index transparent materials such as high-refractive-index glass. A diameter 108 of the substrate 101 may be 300 mm or less, e.g., 200 mm.

Figure 2:
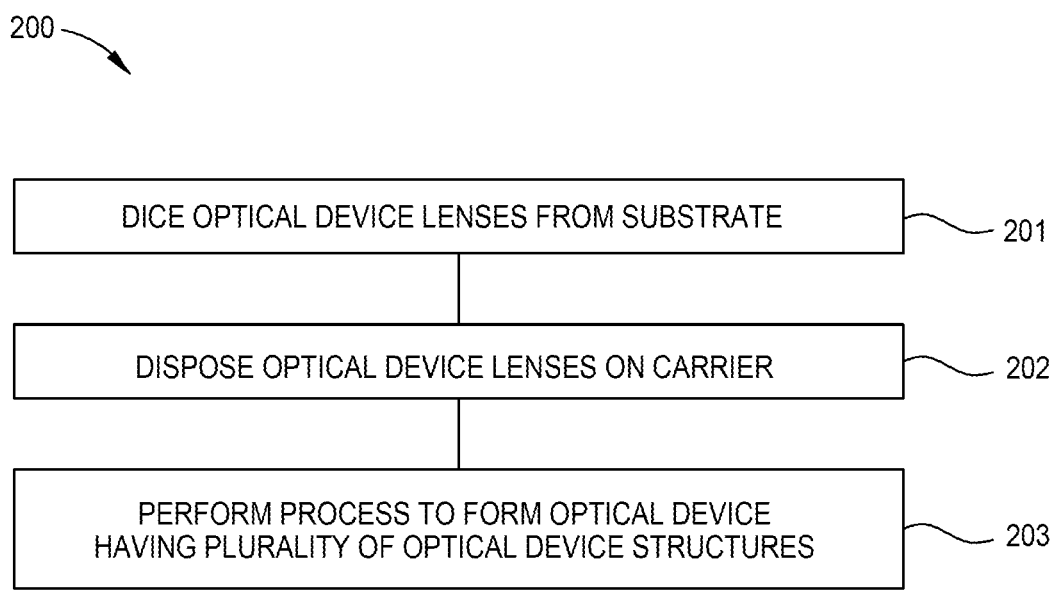
FIG. 2 is a flow diagram of a method of forming a plurality of optical devices according to one or more embodiments.

FIG. 2 is a flow diagram of a method 200 of forming a plurality of optical devices 100 according to one or more embodiments. FIGS. 3A-3C, and 3E are schematic, plan views of a plurality of optical device lenses 105.

Figure 3A:
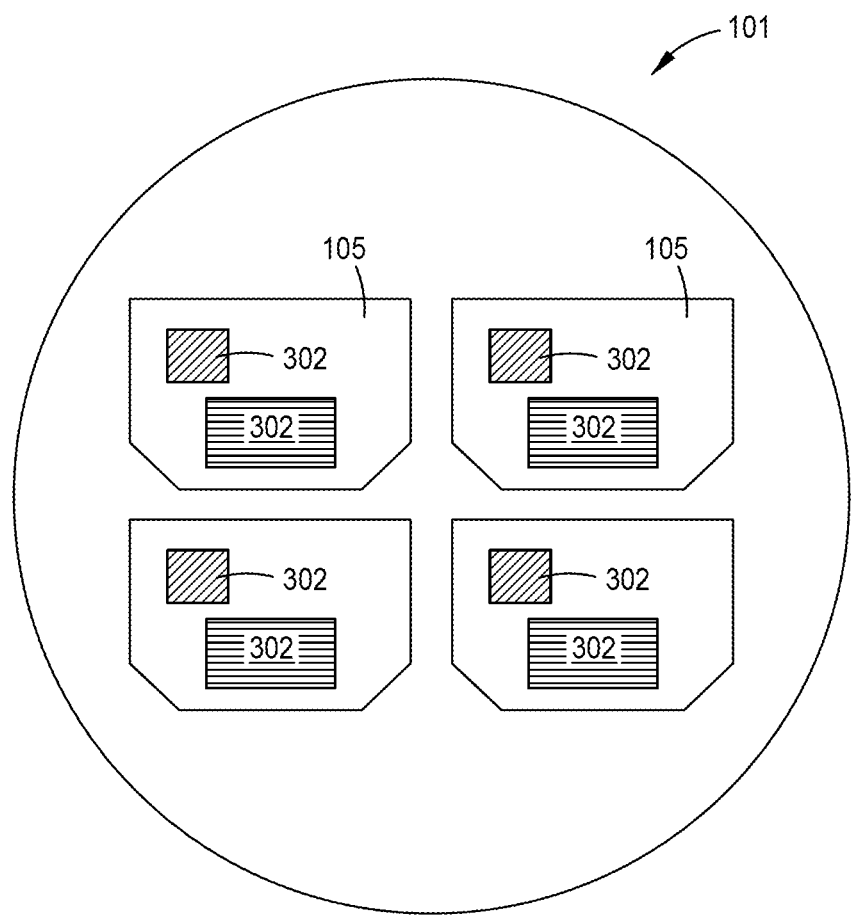
FIGS. 3A-3C, and 3E are schematic, plan views of a plurality of optical device lenses according to one or more embodiments.

According to embodiments of FIG. 3A, one or more patterning processes may be performed before dicing the optical device lenses 105 from the substrate 101. The one or more patterning processes include at least one of nanoimprint lithography, photolithography, physical vapor deposition (PVD), chemical vapor deposition (CVD), atomic layer deposition (ALD), plasma etching, wet etching, or plasma ashing. During patterning, a resist layer is disposed on the plurality of optical device lenses 105. The resist layer may include photo- or nano-resist. The resist layer is patterned by the one or more patterning processes before the optical device lenses 105 are diced from the substrate, thereby forming a patterned resist layer 302 disposed on the optical device lenses 105. In one embodiment, which can be combined with other embodiments described herein, the one or more patterning processes include a deposition operation, a lithography operation, and an etch operation. In one embodiment, which can be combined with other embodiments described herein, a clean operation occurs after one or more of the deposition operation, the lithography operation, and/or the etch operation. In one embodiment, which can be combined with other embodiments described herein, an encapsulation operation occurs after the etch operation.

Figure 3B:
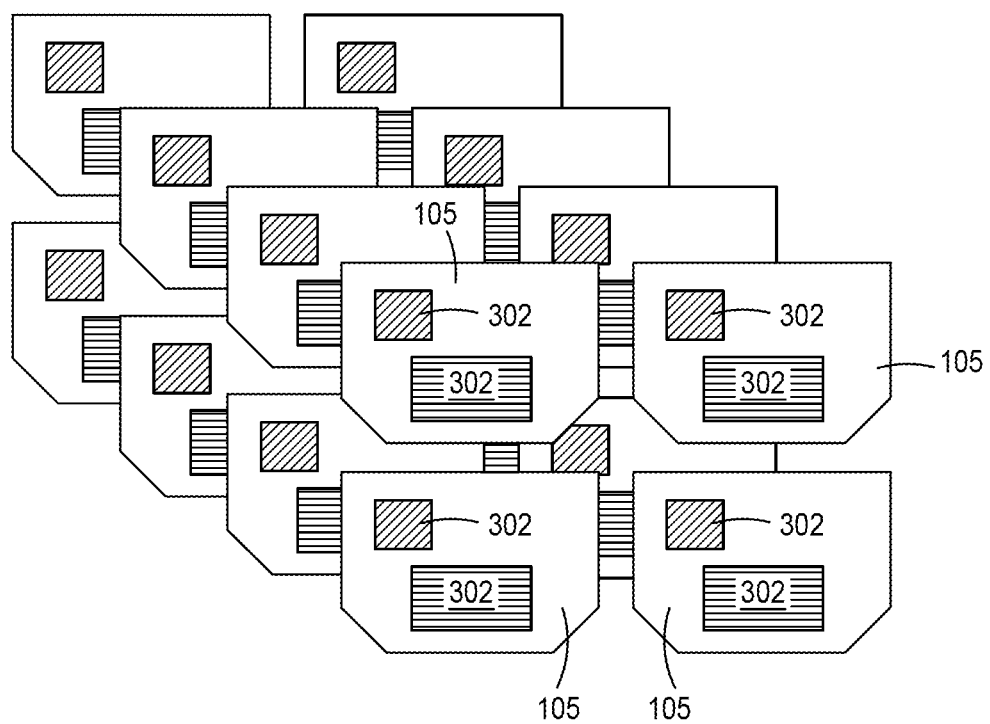

At operation 201, as shown in FIG. 3B, the optical device lenses 105 are diced from the substrate 101. The optical device lenses 105 are diced using any suitable method, e.g., laser dicing. In one embodiment, which can be combined with other embodiments described herein, the optical device lenses 105 are inspected for defects such as patterning errors and edge discontinuities after the optical device lenses 105 are diced. Defective or sub-optimal optical device lenses 105 are discarded. By dicing and discarding defective optical device lenses 105 prior to performing one or more subsequent processes, throughput is increased and the quality of optical devices produced is improved.

Figure 3C:
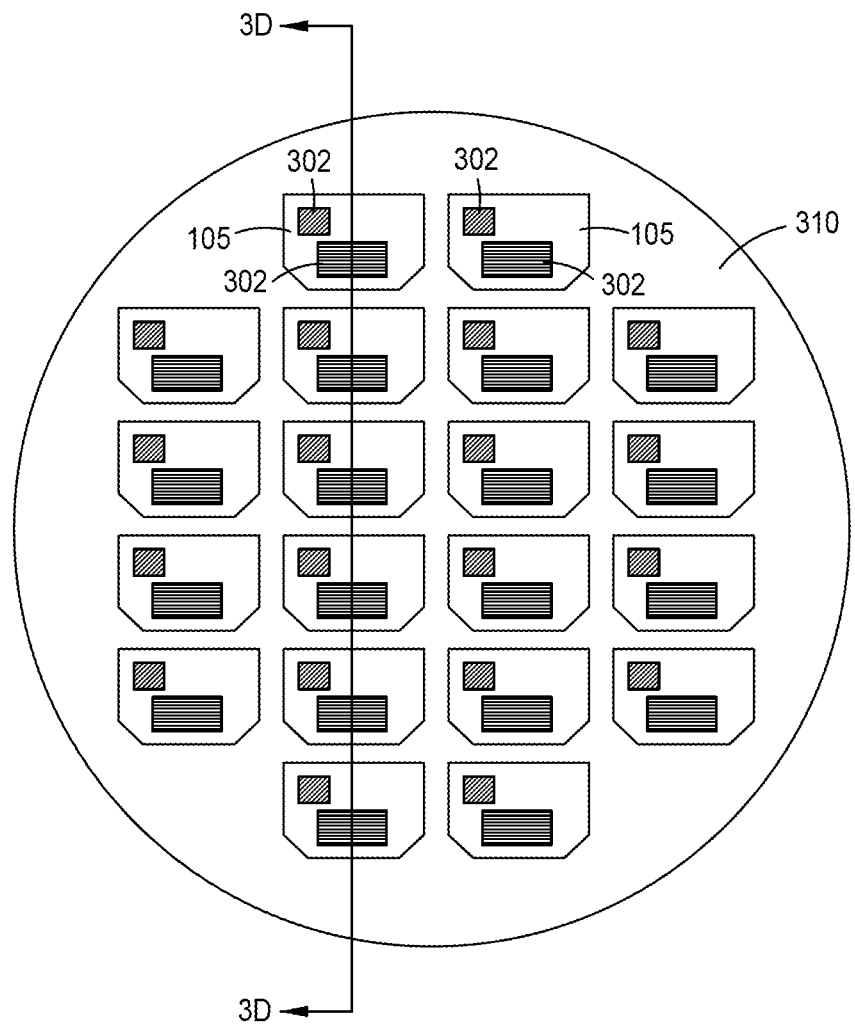
Figure 3D:
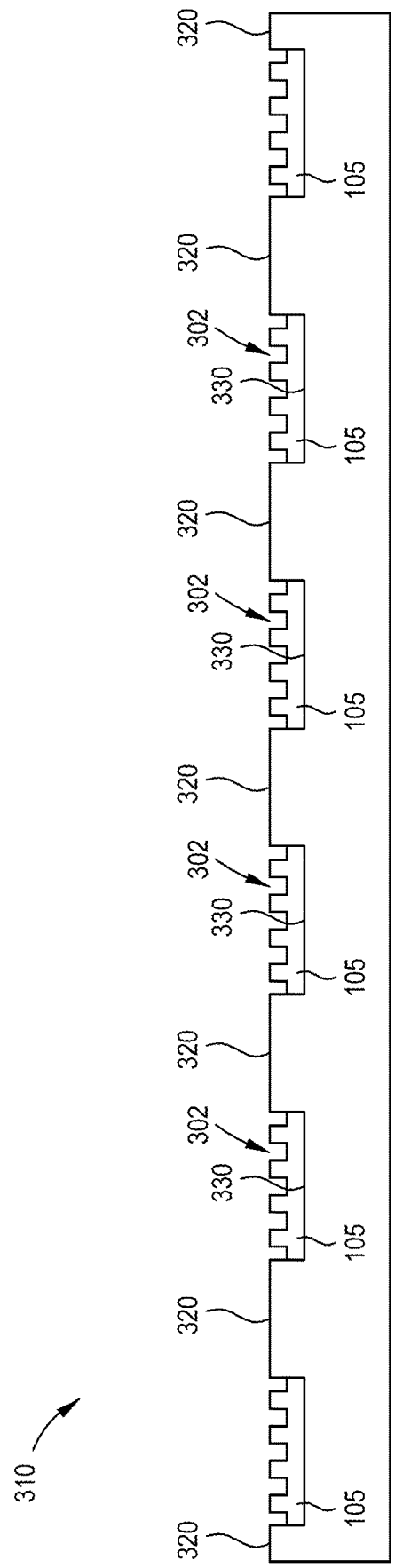
FIG. 3D is a schematic, cross-sectional view of a carrier according to one or more embodiments.

At operation 202, as shown in FIG. 3C, optical device lenses 105 are disposed on a carrier 310. FIG. 3D is a schematic, cross-sectional view of a carrier, for example, carrier 310 of FIG. 3C. The carrier 310 is any suitable carrier operable to retain the optical device lenses 105 for further processing. In one embodiment, as shown in FIG. 3C, one or more pockets 330 formed by a plurality of sidewalls 320 retain the optical device lenses 105. The one or more pockets 330 are fabricated in order to securely hold the optical device lenses 105 as the carrier 310 is transported. In another embodiment, which can be combined with other embodiments described herein, the one or more pockets 330 are formed by a plurality of pins (not shown) disposed on the carrier 310. The plurality of pins surround the perimeter of the optical device lenses 105 such that the optical device lenses 105 are retained in place. The plurality of pins are disposed through the carrier 310 and a plurality of lips (not shown). The plurality of lips position the optical device lenses 105 above the carrier 310 such that the backside of the optical device lenses 105 are not damaged during processing. Operations 201 and 202 are repeated until a desired number of optical device lenses 105 have been diced from one or more substrates 101 and disposed on the carrier 310.

Although FIG. 3C depicts 20 optical device lenses 105 disposed on the carrier 310, the carrier 310 may hold any suitable number of optical device lenses 105. In one embodiment, which can be combined with other embodiments described herein, the carrier 310 is able to retain 10 or more optical device lenses 105. In another embodiment, which can be combined with other embodiments described herein, the carrier 310 is able to retain 20 or more optical device lenses 105. The carrier 310 may be any suitable shape for the desired processes and/or processing chambers. In one embodiment, which can be combined with other embodiments described herein, the carrier 310 is circular. In another embodiment, which can be combined with other embodiments described herein, the carrier 310 is rectangular.

Figure 3E:
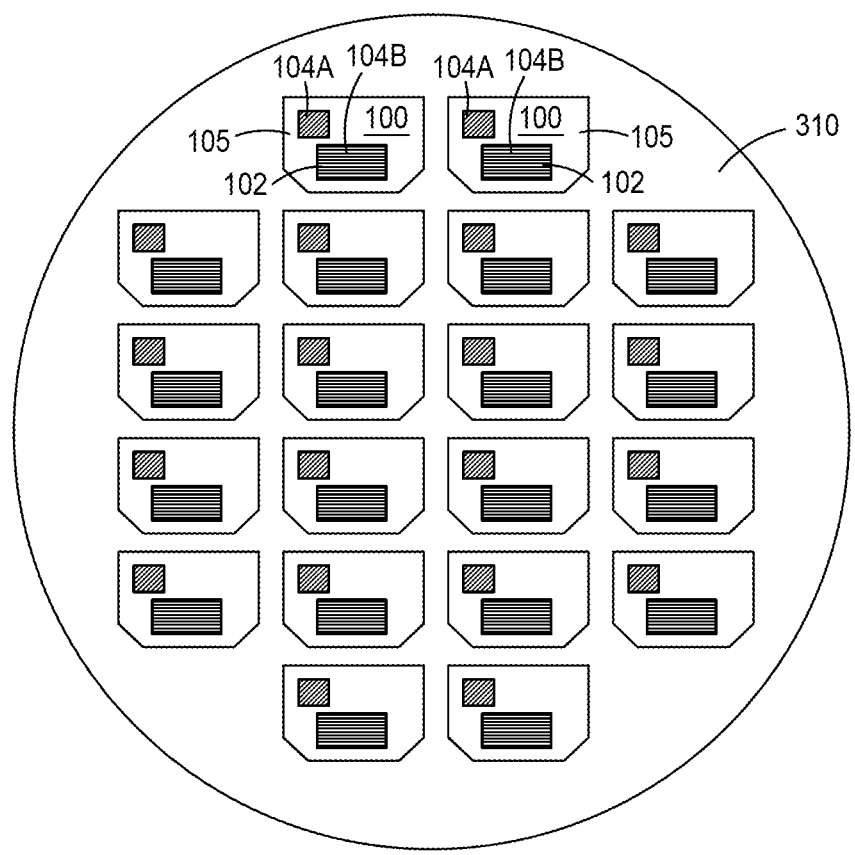

At operation 203, as shown in FIG. 3E, at least one process is performed on the plurality of optical device lenses 105 to form a plurality of optical devices 100, each optical device 100 having a plurality of optical device structures 102. In one embodiment, which can be combined with other embodiments described herein, the at least one process includes at least one of nanoimprint lithography, photoresist lithography, e-beam lithography, encapsulation, ion beam etching, e-beam etching, reactive ion etching, and/or angled etching. In one embodiment, which can be combined with other embodiments described herein, regions of the optical device structures 102 correspond to one or more gratings, such as a first grating 104A and a second grating 104B.

The method 200 disclosed herein enables the formation of a plurality of optical devices 100 by maximizing use of chamber space. While the diameter of the substrate 101 depicted in FIG. 1 may be about 200 mm or 300 mm, the diameter or width of the carrier 310 may be larger. The carrier is at least larger than 300 mm. Additionally, in embodiments where the carrier 310 is rectangular, space is used more efficiently in tools that are not radially symmetric, e.g., an inkjet printer or a scanning-type etch tool. Thus, more optical device lenses 105 are able to be processed according to the method 200. For example, throughput is increased from 8 or fewer optical devices as depicted in FIGS. 1 to 20 or more optical devices 100 as depicted in FIG. 3E.

In summation, according to methods of forming optical devices described herein, overall processing efficiency is improved. By removing defective optical device lenses from the process flow early, less time is spent on processing defective lenses that will eventually need to be discarded. Instead, processing space is used optimally in order to maximize production of the desired optical devices.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
dicing a plurality of optical device lenses from a substrate, wherein the substrate includes a first quantity of the plurality of optical device lenses;
inspecting the plurality of optical device lenses for a defective optical device lens, wherein the defective optical device lens contains a defect;
discarding the defective optical device lens;
disposing a second quantity of the plurality of optical device lenses on a carrier, wherein the second quantity of the plurality of optical device lenses is greater than the first quantity of the plurality of optical device lenses; and
performing at least one process on the plurality of optical device lenses disposed on the carrier to form a plurality of optical devices, each optical device having a plurality of optical device structures.

2. The method of claim 1, further comprising:
performing one or more patterning processes prior to the dicing of the plurality of optical device lenses from the substrate.

3. The method of claim 2, wherein the one or more patterning processes comprise at least one of nanoimprint lithography, photolithography, physical vapor deposition, chemical vapor deposition, atomic layer deposition, plasma etching, wet etching, or plasma ashing.

4. The method of claim 1, wherein the at least one process comprises at least one of nanoimprint lithography, photoresist lithography, e-beam lithography, encapsulation, ion beam etching, reactive ion etching, or angled etching.

5. The method of claim 1, further comprising disposing the plurality of optical device lenses in one or more pockets formed in the carrier.

6. The method of claim 5, wherein the one or more pockets include a plurality of pins, such that the plurality of pins are disposed through the carrier and surround a perimeter of the optical device lenses.

7. The method of claim 6, wherein the one or more pockets include a plurality of lips, such that the plurality of lips position the optical device lenses above the carrier.

8. The method of claim 1, wherein the first quantity of the plurality of optical device lenses comprises 8 or fewer optical device lenses.

9. The method of claim 8, wherein the second quantity of the plurality of optical device lenses comprises 10 or more optical device lenses.

10. The method of claim 1, wherein a diameter of the carrier is greater than a diameter of the substrate.

11. The method of claim 1, wherein a diameter of the carrier is greater than 300 mm.

12. The method of claim 1, wherein the carrier is rectangular.

13. The method of claim 1, wherein the carrier is circular.

14. The method of claim 1, further comprising patterning a resist layer on the optical device lenses prior to the dicing of the plurality of optical device lenses from the substrate.

15. A method, comprising:
performing one or more patterning processes on a substrate;
dicing a plurality of optical device lenses from a substrate, wherein the substrate includes a first quantity of the plurality of optical device lenses;
inspecting the plurality of optical device lenses for a defective optical device lens, wherein the defective optical device lens contains a defect;
discarding the defective optical device lens;
disposing the plurality of optical device lenses on a carrier, wherein the carrier is configured to retain a second quantity of the plurality of optical device lenses, wherein the second quantity is greater than the first quantity of the plurality of optical device lenses diced from the substrate; and
performing at least one process on the plurality of optical device lenses to form a plurality of optical devices, each optical device having a plurality of optical device structures.

16. The method of claim 15, wherein the at least one process comprises a deposition operation, a lithography operation, and an etch operation.

17. The method of claim 16, further comprising cleaning the optical device lenses after one or more of the deposition operation, the lithography operation, or the etch operation.

18. The method of claim 16, further comprising encapsulating the optical device lenses after the etch operation.

19. The method of claim 15, wherein the carrier comprises a plurality of pockets operable to retain the optical device lenses.

20. A method, comprising:
performing one or more patterning processes on a substrate, the one or more patterning processes comprising at least one of nanoimprint lithography, photolithography, physical vapor deposition, chemical vapor deposition, atomic layer deposition, plasma etching, wet etching, or plasma ashing;
dicing a plurality of optical device lenses from the substrate, wherein the substrate includes a first quantity of the plurality of optical device lenses;
inspecting the plurality of optical device lenses for a defective optical device lens, wherein the defective optical device lens contains a defect;
discarding the defective optical device lens;
disposing a second quantity the plurality of optical device lenses on a carrier, wherein the second quantity of the plurality of optical device lenses is greater than the first quantity of the plurality of optical device lenses; and
performing at least one process on the plurality of optical device lenses to form a plurality of optical devices, the at least one process comprising of nanoimprint lithography, photoresist lithography, e-beam lithography, encapsulation, ion beam etching, reactive ion etching, and angled etching, each optical device having a plurality of optical device structures.

* * * * *